M. A. SPINK.
Plow-Colter.
No. 48,849. Patented July 18, 1865.
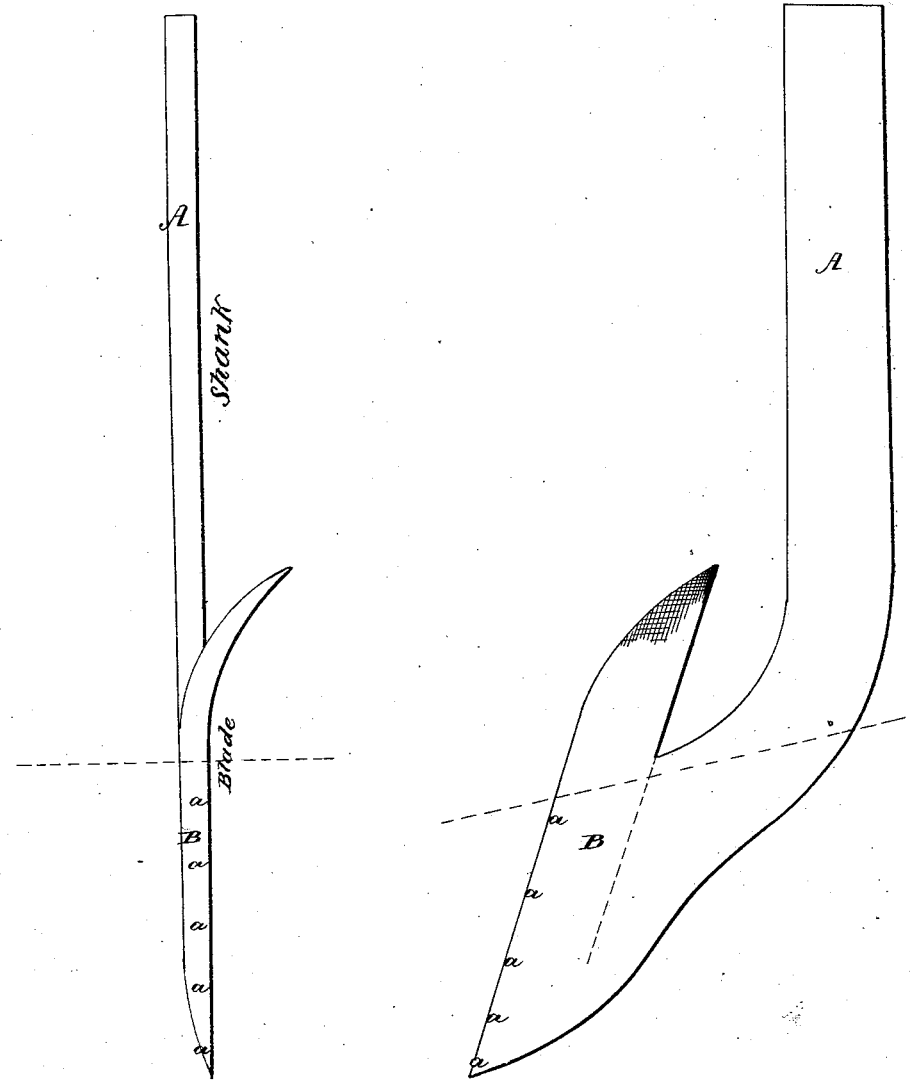

UNITED STATES PATENT OFFICE.

MORRIS A. SPINK, OF DE KALB, NEW YORK.

IMPROVEMENT IN STUBBLE-COLTERS.

Specification forming part of Letters Patent No. 48,849, dated July 18, 1865.

*To all whom it may concern:*

Be it known that I, MORRIS A. SPINK, of the town of De Kalb, in the county of St. Lawrence and State of New York, have invented a new and Improved Stubble-Colter—a useful machine for use upon a plow in the place of the ordinary straight colter; and the invention and improvement consists in the shape of the shank of the stubble-colter, (see the drawings A,) it being made with a curvature near the lower part, as exhibited, and terminating at its junction with the blade. (See the drawings B.) The dotted line at the junction of the shank and blade is merely to distinguish the one from the other in description. The shank and blade are one entire piece, and of the same material—iron—except the cutting forward edge, which should be faced with steel.

The further invention and improvement is the blade, (drawings B,) being the continuation of the shank, and terminating in the edge or cutting part of the blade *a a a*, and rising above its connection with the shank in a continuation of the dotted black line, and curved over on the continuation of this line to the left side to the top or upper point, which is formed by the continuation of the cutting-line of the blade *a a a* on a gradual curve backward and to the left side until it meets the dotted black line or top point of the blade. The blade cutting-line diverges from the plane of the left side, (No. 2 in the drawings,) and curves to meet the black dotted line, as above stated.

The above is a clear and exact description of the construction of the stubble-colter, reference being had to the annexed drawings, making a part of this specification, in which—

Figure No. 1 is a front view, and Fig. No. 2 is a side view.

The operation of the stubble-colter is as follows: It cuts the earth under the plow-beam and forward of the plowshare to the depth of about four inches from the surface, (represented by the red dotted lines,) and at the angle represented, and cleans itself of the stubble and other material, which is forced up and rises along the cutting-edge *a a a*, by directing it along the curvature to the left and top of the blade, from which it falls upon the ground to the left of the furrow being turned, such stubble and material so turned off and dropped being covered under the furrow the next time round, or by the succeeding furrow. In the ordinary or straight colter this stubble and material rises and is forced up along its cutting and forward edge until it chokes up the space between the colter and the plow-beam, and so accumulates upon the cutting-edge of the colter and destroys its efficiency. In the stubble-colter this is avoided by the blade rising up from its junction with the shank and sending stubble and material along the curvature described until it falls from the top point of the blade upon the ground, as stated.

The usefulness of the invention and improvement consists in the saving of time occupied in clearing away the clogging material accumulating with the common colter and destroying its efficiency.

What I claim as my invention, and desire to secure by Letters Patent, is—

The herein-described colter, consisting of the shank A and blade B, the same being constructed as and for the purpose set forth.

MORRIS A. SPINK.

In presence of—
 F. VAN WATERS,
 J. MCNAUGHTON.